US012435877B2

(12) United States Patent
Panduri et al.

(10) Patent No.: US 12,435,877 B2
(45) Date of Patent: Oct. 7, 2025

(54) GAS TURBINE ENGINE COMBUSTOR WITH A SET OF DILUTION PASSAGES

(71) Applicant: GENERAL ELECTRIC COMPANY, Schenectady, NY (US)

(72) Inventors: Bhavya Naidu Panduri, Bengaluru (IN); Perumallu Vukanti, Bengaluru (IN); Pradeep Naik, Bengaluru (IN); Michael T. Bucaro, Arvada, CO (US); Sibtosh Pal, Mason, OH (US); Aritra Chakraborty, Bengaluru (IN); Pabitra Badhuk, Bengaluru (IN); Arijit Sinha Roy, Bengaluru (IN); Ajoy Patra, Bengaluru (IN); R Narasimha Chiranthan, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 18/296,220

(22) Filed: Apr. 5, 2023

(65) Prior Publication Data

US 2024/0280264 A1 Aug. 22, 2024

(30) Foreign Application Priority Data

Feb. 20, 2023 (IN) ............................ 202311011415

(51) Int. Cl.
*F23R 3/06* (2006.01)
*F23R 3/00* (2006.01)

(52) U.S. Cl.
CPC ................ *F23R 3/06* (2013.01); *F23R 3/002* (2013.01)

(58) Field of Classification Search
CPC .................................. F23R 3/06; F23R 3/002
See application file for complete search history.

(56) References Cited

U.S. PATENT DOCUMENTS 3,608,310 A * 9/1971 Vaught .................... F01D 9/023 60/752
3,671,171 A 6/1972 Doyle
5,220,795 A 6/1993 Dodds et al.
5,239,818 A 8/1993 Stickles et al.
6,474,070 B1 * 11/2002 Danis ...................... F23R 3/343 60/754
7,926,284 B2 4/2011 Zupanc et al.
(Continued)

FOREIGN PATENT DOCUMENTS

CN 115218214 A 10/2022
EP 0564183 B1 7/1997
(Continued)

*Primary Examiner* — Gerald L Sung
*Assistant Examiner* — Rene D Ford
(74) *Attorney, Agent, or Firm* — Carter, DeLuca & Farrell LLP

(57) ABSTRACT

A combustor for a gas turbine engine. The combustor having a dome wall, a set of fuel cups, an inner liner, an outer liner, and a set of dilution passages. The dome wall, the inner liner, and the outer liner, together, at least partially defining a combustion chamber. The set of dilution passages terminating in a plurality of dilution holes arranged in a dilution hole arrangement provided in at least one of the inner liner or the outer liner. The dilution hole arrangement having at least a first subset of dilution holes arranged along a first leg and a second subset of dilution holes arranged along a second leg.

17 Claims, 11 Drawing Sheets

(56) References Cited

U.S. PATENT DOCUMENTS

| | | | | |
|---|---|---|---|---|
| 8,171,740 | B2 * | 5/2012 | Bronson | F23R 3/045 60/754 |
| 8,215,118 | B2 * | 7/2012 | Pieussergues | F23R 3/06 60/740 |
| 8,616,004 | B2 | 12/2013 | Zupanc et al. | |
| 8,739,546 | B2 | 6/2014 | Snyder et al. | |
| 9,175,856 | B2 * | 11/2015 | Sandelis | F23R 3/50 |
| 9,279,588 | B2 | 3/2016 | Commaret et al. | |
| 9,322,554 | B2 | 4/2016 | Kim et al. | |
| 9,765,970 | B2 * | 9/2017 | Bourgois | F23R 3/50 |
| 10,712,006 | B2 * | 7/2020 | Clemen | F23R 3/002 |
| 2003/0167772 | A1 * | 9/2003 | Farmer | F23R 3/06 60/754 |
| 2005/0081526 | A1 * | 4/2005 | Howell | F23R 3/002 60/752 |
| 2006/0059918 | A1 * | 3/2006 | Caldwell | F23R 3/06 60/752 |
| 2008/0010992 | A1 * | 1/2008 | Patterson | F23R 3/06 60/752 |
| 2009/0100840 | A1 | 4/2009 | Campion et al. | |
| 2011/0219774 | A1 | 9/2011 | Bronson et al. | |
| 2011/0271678 | A1 | 11/2011 | Bourgois et al. | |
| 2014/0144145 | A1 | 5/2014 | Rackwitz et al. | |
| 2016/0169517 | A1 | 6/2016 | Graves et al. | |
| 2018/0283689 | A1 | 10/2018 | Wang et al. | |

FOREIGN PATENT DOCUMENTS

| | | | |
|---|---|---|---|
| FR | 2973479 | B1 | 10/2012 |
| GB | 1003883 | | 9/1965 |
| JP | 2010270753 | A | 12/2010 |
| RU | 2539949 | C2 | 1/2015 |
| WO | 2012114030 | A1 | 8/2012 |

* cited by examiner 16
124
78
82a
80
106
108
G
82
82b
120
IV
86
D2
110
122
104
IV
90
92
88
D1
96
C
84
76
100
98
112
F
C
S
14
12

GAS TURBINE ENGINE COMBUSTOR WITH A SET OF DILUTION PASSAGES

CROSS REFERENCE TO RELATED APPLICATION(S)

This application is a continuation of Indian Provisional Patent Application No. 202311011415, filed Feb. 20, 2023, which is incorporated herein in its entirety.

TECHNICAL FIELD

The present subject matter relates generally to a gas turbine engine combustor with a set of dilution passages, more specifically to a combustor having a set of dilution passages forming a dilution hole arrangement located in a liner of the combustor.

BACKGROUND

Gas turbine engines are driven by a flow of combustion gases passing through the engine to rotate a multitude of turbine blades. A combustor can be provided within the gas turbine engine and is fluidly coupled with a turbine into which the combusted gases flow.

Hydrocarbon fuels are commonly used in the combustor of a gas turbine engine. Generally, air and fuel are fed separately to the combustor, until they are mixed, and the mixture is combusted to produce hot combustion gas. The combustion gas is then fed to a turbine where it rotates the turbine to produce power. By-products of the hydrocarbon fuel combustion typically include nitrogen oxide and nitrogen dioxide (collectively called $NO_x$), carbon monoxide (CO), unburned hydrocarbon (UHC) (e.g., methane and volatile organic compounds that contribute to the formation of atmospheric ozone), and other oxides, including oxides of sulfur (e.g., $SO_2$ and $SO_3$).

DETAILED DESCRIPTION

Figure 1:
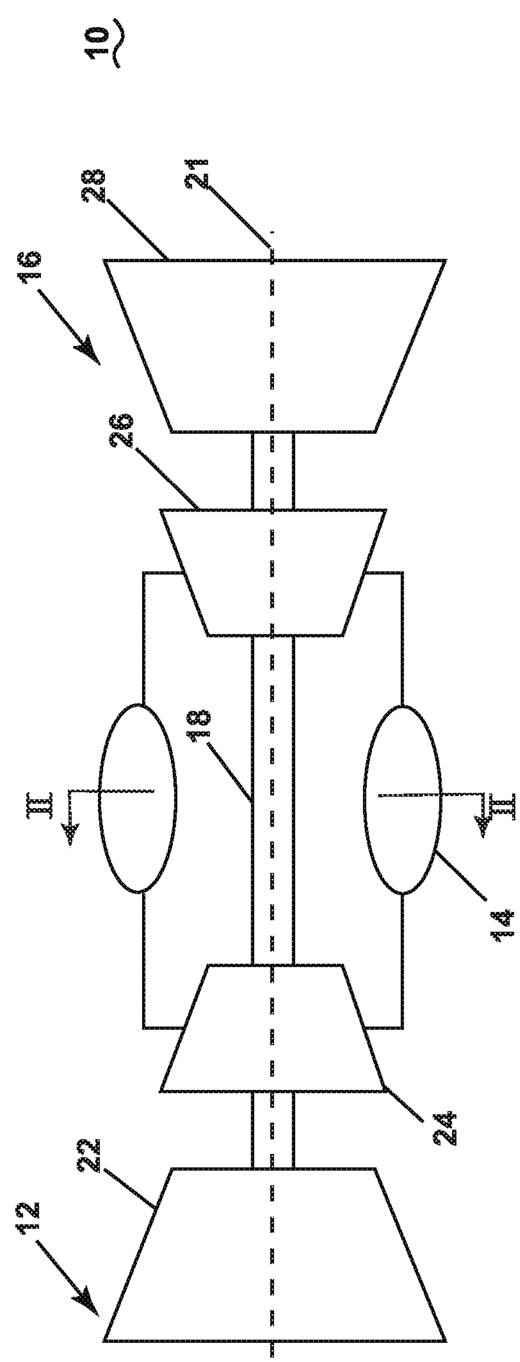
FIG. 1 is a schematic of a gas turbine engine, according to the present disclosure.

Aspects of the disclosure described herein are directed to a combustor. The combustor includes a combustion chamber at least partially defined by a dome wall, an inner liner and an outer liner. A set of fuel cups are annularly arranged on the dome wall and fluidly coupled to the combustion chamber. A set of dilution passages extend through at least one of the inner liner or the outer liner and terminate at a plurality of dilution holes provided on the inner liner or the outer liner, respectively. The plurality of dilution holes forms a plurality of dilution hole arrangements. Each dilution hole arrangement corresponds to a single fuel cup of the set of fuel cups. As described herein, a single “dilution hole arrangement” refers to a plurality of dilution holes provided downstream of a single, corresponding fuel cup of the set of fuel cups. It will be appreciated that there can be any number of dilution hole arrangements. For example, the total number of dilution hole arrangements can correspond to the total number of fuel cups of the set of fuel cups.

For purposes of illustration, the present disclosure will be described with respect to a gas turbine engine. It will be understood, however, that aspects of the disclosure described herein are not so limited and that a combustor as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

As used herein, the terms “first”, “second”, and “third” may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a gas turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 is a schematic view of a gas turbine engine 10. As a non-limiting example, the gas turbine engine 10 can be used within an aircraft. The gas turbine engine 10 can include, at least, a compressor section 12, a combustion section 14, and a turbine section 16 in serial flow arrangement. A drive shaft 18 rotationally couples the compressor and turbine sections 12, 16, such that rotation of one affects the rotation of the other, and defines a rotational axis or engine centerline 21 for the gas turbine engine 10.

The compressor section 12 can include a low-pressure (LP) compressor 22, and a high-pressure (HP) compressor 24 serially fluidly coupled to one another. The turbine section 16 can include an LP turbine 26, and an HP turbine 28 serially fluidly coupled to one another. The drive shaft 18 can operatively couple the LP compressor 22, the HP compressor 24, the LP turbine 26 and the HP turbine 28 together. Alternatively, the drive shaft 18 can include an LP drive shaft (not illustrated) and an HP drive shaft (not illustrated). The LP drive shaft can couple the LP compressor 22 to the LP turbine 26, and the HP drive shaft can couple the HP compressor 24 to the HP turbine 28. An LP spool can be defined as the combination of the LP compressor 22, the LP turbine 26, and the LP drive shaft such that the rotation of the LP turbine 26 can apply a driving force to the LP drive shaft, which in turn can rotate the LP compressor 22. An HP spool can be defined as the combination of the HP compressor 24, the HP turbine 28, and the HP drive shaft such that the rotation of the HP turbine 28 can apply a driving force to the HP drive shaft, which in turn can rotate the HP compressor 24.

The compressor section 12 can include a plurality of axially spaced stages. Each stage includes a set of circumferentially spaced rotating blades and a set of circumferentially spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing, which can extend circumferentially about the gas turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially spaced, rotating blades and a set of circumferentially spaced, stationary vanes. The turbine blades for a stage of the turbine section 16 can be mounted to a disk, which is mounted to the drive shaft 18. Each set of blades for a given stage can have its own disk. The vanes of the turbine section 16 can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 28 at a downstream end of the combustion section 14.

During operation of the gas turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 28, which drives the HP compressor 24. The combustion gases are discharged into the LP turbine 26, which extracts additional work to drive the LP compressor 22, and the exhaust gas is ultimately discharged from the gas turbine engine 10 via an exhaust section (not illustrated) downstream of the turbine section 16. The driving of the LP turbine 26 drives the LP spool to rotate the fan (not illustrated) and the LP compressor 22. The pressurized airflow and the combustion gases can together define a working airflow that flows through the fan, compressor section 12, combustion section 14, and turbine section 16 of the gas turbine engine 10.

Figure 2:
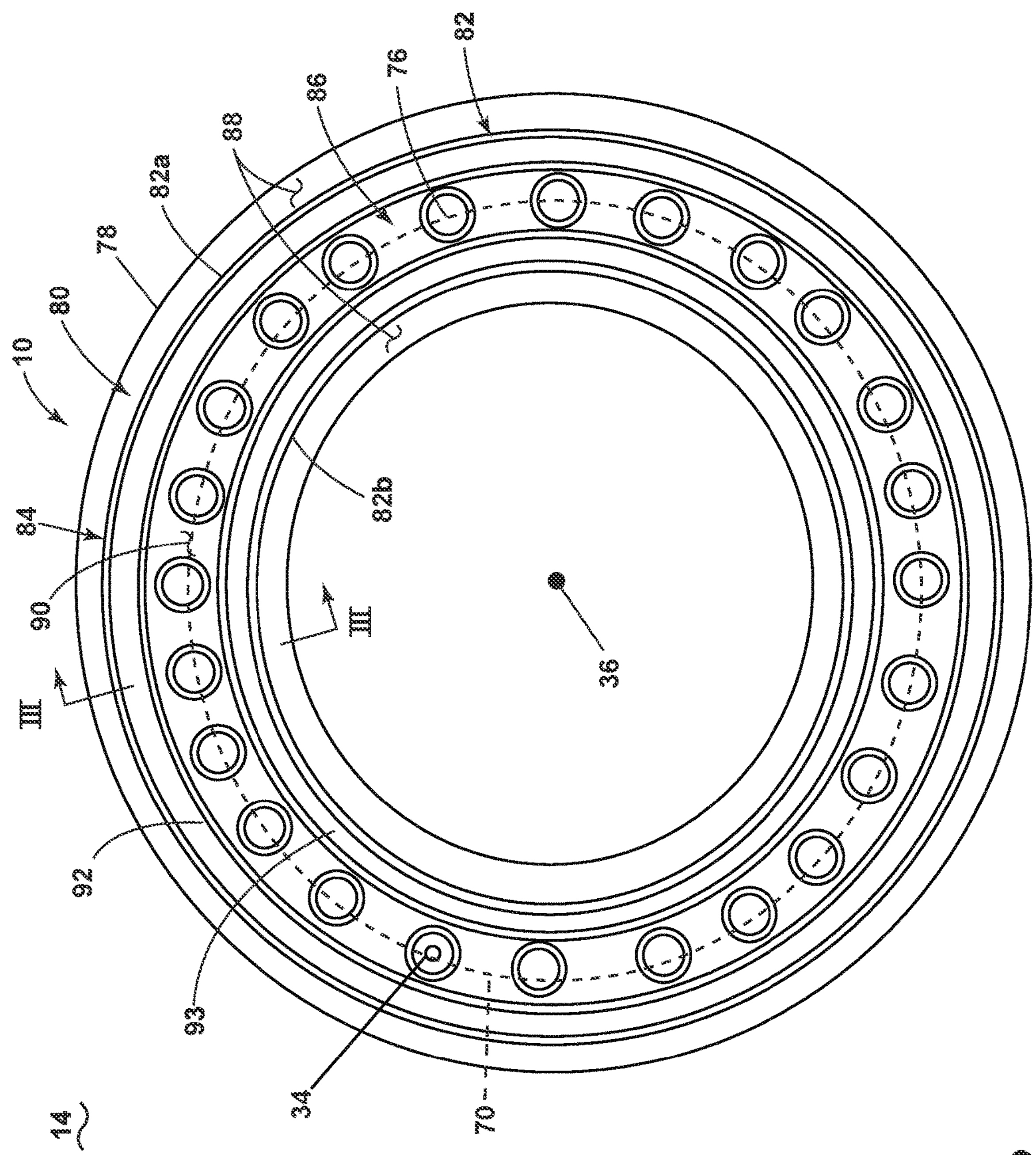
FIG. 2 depicts a cross-section view along line II-II of FIG. 1 of a combustion section of the gas turbine engine, the combustion section having a combustor centerline, according to the present disclosure.

FIG. 2 depicts a cross-section view of the combustion section 14 along line II-II of FIG. 1. The combustion section 14 includes a combustor 80 having a set of fuel cups 76 disposed around a combustor centerline 36. The combustor centerline 36 can be in-line with, offset from, parallel to, or non-parallel to the engine centerline 21 of the gas turbine engine 10 (FIG. 1). The combustor centerline 36 can be a centerline for an entirety of the combustion section 14, a single combustor, or a set of combustors that are arranged about the combustor centerline 36.

The combustor 80 can have a can, can-annular, or annular arrangement depending on the type of engine in which the combustor 80 is located. In a non-limiting example, an annular arrangement is illustrated and disposed within a casing 78. The combustor 80 is defined by a liner 82 including an outer liner 82*a* and an inner liner 82*b* concentric with respect to each other and annular about the combustor centerline 36. The combustor 80 includes a dome assembly 84 including a dome wall 90. The dome wall 90, the outer liner 82*a* and the inner liner 82*b*, together, at least partially define a combustion chamber 86. The combustion chamber 86 is annular about the combustor centerline 36.

At least one fuel cup 76, illustrated as multiple fuel injectors annularly arranged about the combustor centerline 36, is fluidly coupled to the combustion chamber 86. A compressed air passageway 88 can be defined at least in part by both the liner 82 and the casing 78.

The at least one fuel cup 76 is included within a plurality of fuel cups 76. Each fuel cup 76 can include a fuel cup centerline 34 that extends into the page. Each fuel cup centerline 34 can be arranged along a circumferential line 70. Alternatively, one or more fuel cups 76 can be offset from the circumferential line 70. Additionally, the fuel cups 76 can be arranged such that the fuel cup centerlines 34 form a pattern relative to, but not necessarily on, the circumferential line 70.

Figure 3:
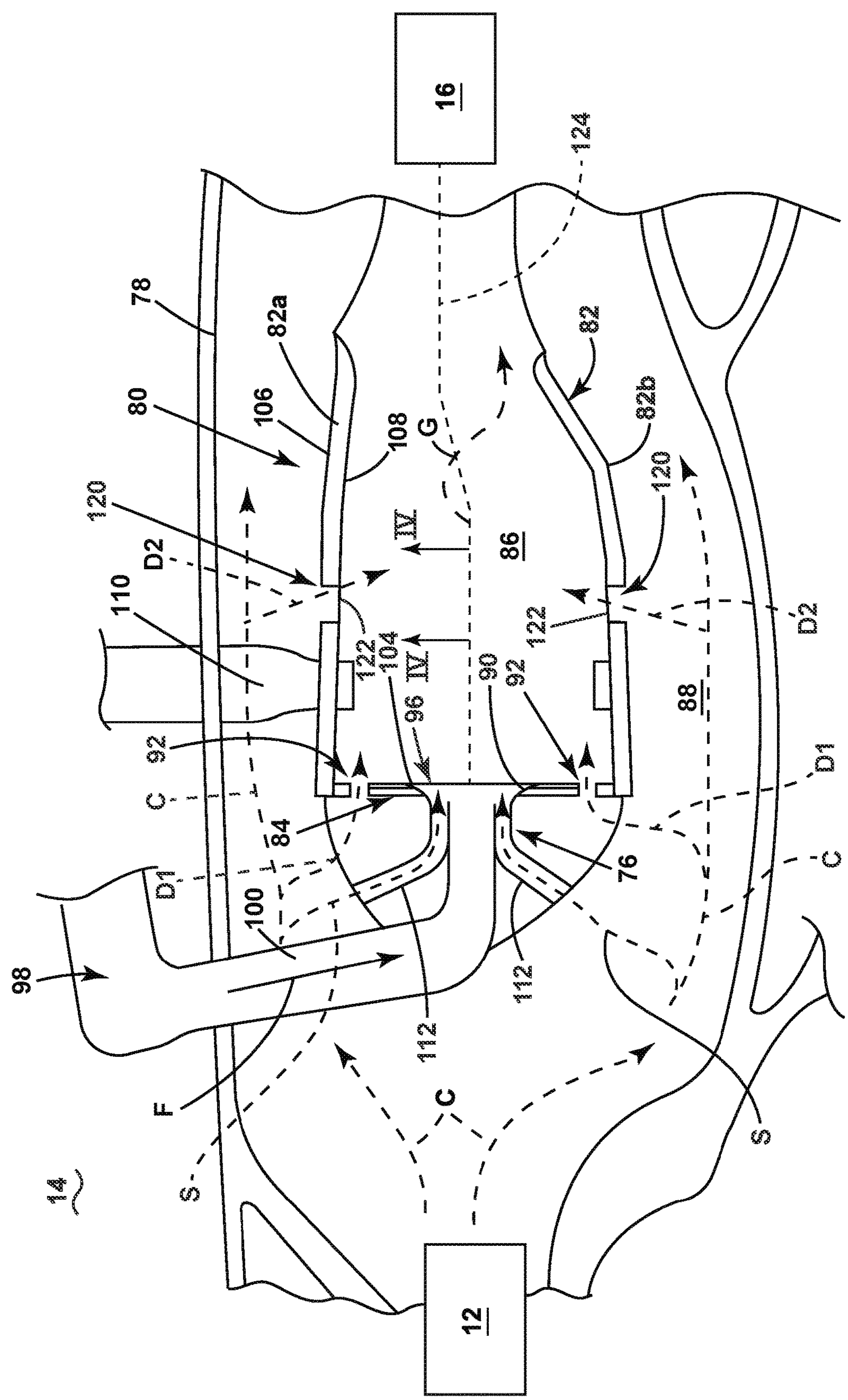
FIG. 3 is a schematic of a side cross-sectional view taken along line III-III of FIG. 2 of a combustor in the combustion section having a liner and a set of dilution passages arranged along the liner, the combustor having a mean centerline, according to the present disclosure.

FIG. 3 depicts a cross-section view taken along line III-III of FIG. 2 illustrating the combustion section 14.

The fuel cup 76 can be coupled to and disposed within the dome assembly 84. The fuel cup 76 can include a flare cone 104 and a swirler 112. The flare cone 104 includes an outlet 96 of the fuel cup 76 directly fluidly coupled to the combustion chamber 86. The fuel cup 76 is fluidly coupled to a fuel inlet 98 via a linear passageway 100.

Both the outer and inner liners 82*a*, 82*b* can have an outer surface 106 and an inner surface 108 at least partially defining the combustion chamber 86. The liner 82 can be made of one continuous monolithic portion or be multiple monolithic portions assembled together to define the outer and inner liners 82*a*, 82*b*. By way of non-limiting example, the outer surface 106 can define a first piece of the liner 82 while the inner surface 108 can define a second piece of the liner 82 that when assembled together form the liner 82. It is further contemplated that the liner 82 can be any type of liner 82, including but not limited to a single wall or a double walled liner or a tile liner. An ignitor 110 can be provided at the liner 82 and fluidly coupled to the combustion chamber 86, at any location.

When viewed from an axial plane extending from the engine centerline 21 (FIG. 1) and passing through a center point of the fuel cup 76, a mean centerline 124, lying in the axial plane, extends through the combustion chamber 86 equidistant between the inner liner 82*b* and the outer liner 82*a*. The mean centerline 124 can begin at or be radially offset from the fuel cup centerline 34 (FIG. 2) at the outlet 96.

A set of dilution passages can extend through a portion of the combustor 80 and terminate at a plurality of dilution holes exhausting into the combustion chamber 86. As a non-limiting example, a first set of dilution passages 92 can extend through the dome wall 90, while a second set of dilution passages 120 can extend through at least one of the inner liner 82*b* or the outer liner 82*a*. The second set of dilution passages 120 terminate at a plurality of dilution holes 122 arranged along the inner liner 82*b* or the outer liner 82*a*.

During operation, a compressed air (C) can flow from the compressor section 12 to the combustor 80 through the dome assembly 84. The compressed air (C) is fed to the fuel cup 76 via the swirler 112 as a swirled airflow (S). A flow of fuel (F) is fed to the fuel cup 76 via the fuel inlet 98 and the linear passageway 100. The swirled airflow (S) and the flow of fuel (F) are mixed at the flare cone 104 and fed to the combustion chamber 86 as a fuel/air mixture. The ignitor 110 can ignite the fuel/air mixture to define a flame within the combustion chamber 86, which generates a combustion gas (G). While shown as starting axially downstream of the outlet 96, it will be appreciated that the fuel/air mixture can be ignited at or near the outlet 96.

The compressed air (C) is further fed to the first set of dilution passages 92 as a first dilution airflow (D1) and to the second set of dilution passages 120 as a second dilution airflow (D2). The first dilution airflow (D1) is used to direct and shape the flame, while the second dilution airflow (D2) is used to further shape and direct the combustion gas (G). It is contemplated that the compressed air (C) fed through the dilution holes 122 can make up greater than or equal to 20% and less than or equal to 80% of the total compressed air (C) that is fed to the combustor 80. As a non-limiting example, the compressed air (C) fed through the dilution holes 122 can make up greater than or equal to 30% and less than or equal to 50% of the total compressed air (C) that is fed to the combustor 80.

The combustor 80 shown in FIG. 3 is well suited for the use of a hydrogen-containing gas as the fuel because it helps contain the faster moving flame front associated with hydrogen fuel, as compared to traditional hydrocarbon fuels. However, the combustor 80 can be used with traditional hydrocarbon fuels.

Figure 4:
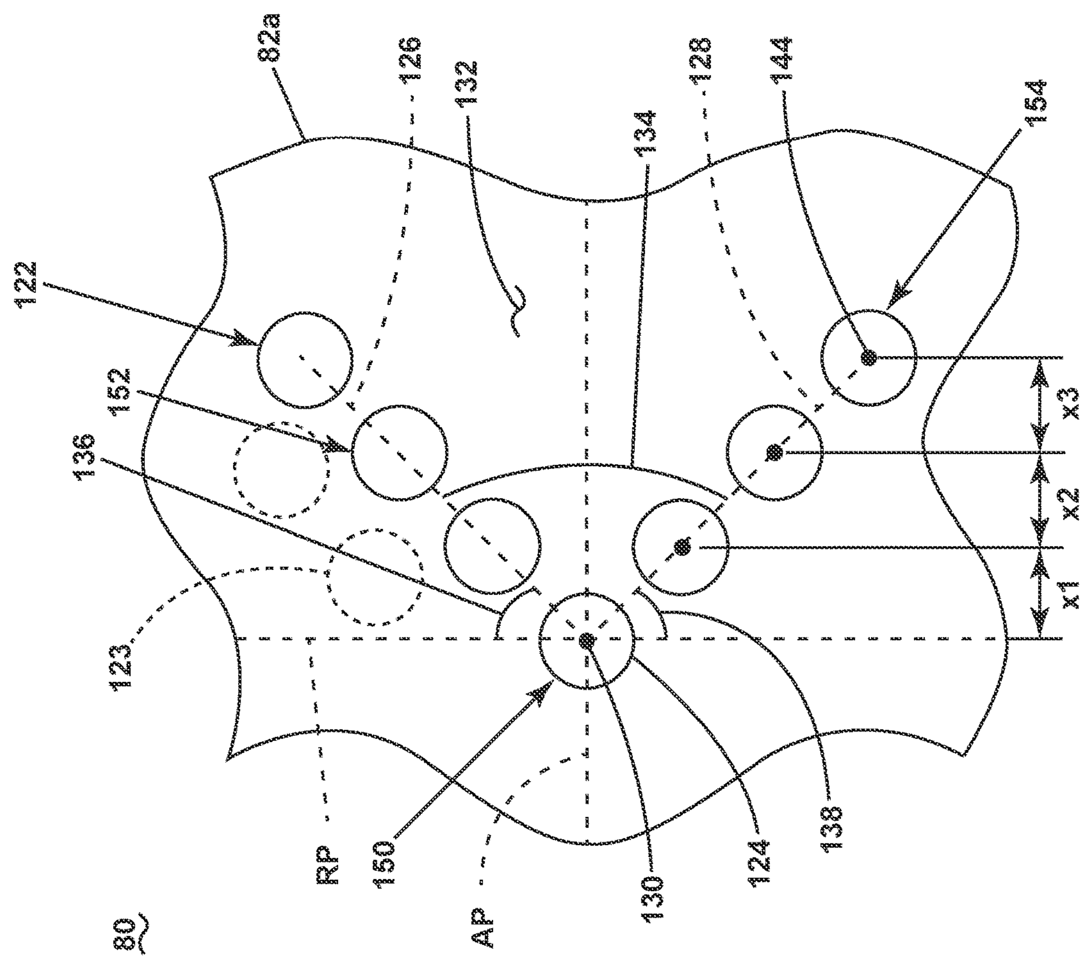
FIG. 4 is a schematic bottom view of a first dilution hole arrangement provided on the liner as seen from line IV-IV of FIG. 3, the first dilution hole arrangement having a plurality of dilution holes arranged along a first leg and a second leg, according to the present disclosure.

FIG. 4 is a schematic bottom view of a first dilution hole arrangement 150 provided on the outer liner 82*a* as seen from line IV-IV of FIG. 3. While described in terms of being provided on the outer liner 82*a*, it will be appreciated that the first dilution hole arrangement can be provided on the inner liner 82*b* (FIG. 3).

The first dilution hole arrangement 150 includes a subset of the second set of dilution passages 120 (FIG. 3) terminating at a subset of the plurality of dilution holes 122. Each dilution passage 120 includes a passage centerline that terminates at a center point 144 at each dilution hole of the plurality of dilution holes 122. A first subset of dilution holes 152 of the plurality of the dilution holes 122 are arranged along a first leg 126, while a second subset of dilution holes 154 of the plurality of the dilution holes 122 are arranged along a second leg 128. The first leg 126 and the second leg 128 extend between each center point 144 of the first subset of dilution holes 152 and the second subset of dilution holes 154, respectively.

The first leg 126 extends non-parallel to the second leg 128. The first leg 126 and the second leg 128 meet at an apex 130. The apex 130 can coincide (as illustrated) with or is offset from the center point 144 of a single dilution hole of the plurality of dilution holes 122. The apex 130 is pointed toward the dome wall 90 (FIG. 3). In other words, the apex 130 defines an axially nearest portion of the first leg 126 and the second leg 128 to the dome wall 90 (FIG. 3). The apex 130 can further be provided within or offset from the boundaries of a dilution hole of the plurality of dilution holes 122.

A radial plane (RP) and an axial plane (AP) are used as planes of reference. The axial plane (AP) extends axially from the combustor centerline 36 (FIG. 2) along the mean centerline 124 (FIG. 3) and intersects the fuel cup centerline 34 (FIG. 2) at the outlet 96 (FIG. 3) of a fuel cup 76 (FIG. 2) axially upstream of and circumferentially nearest the first dilution hole arrangement 150. The apex 130 is provided on or offset from the axial plane (AP). The radial plane (RP) extends radially from and is perpendicular to the combustor centerline 36 and intersects the apex 130. The radial plane (RP) is perpendicular to the axial plane (AP).

The plurality of dilution holes 122 extending along the first leg 126 and the second leg 128 can be equally or non-equally axially spaced, with respect to the mean centerline 124 FIG. 3). As a non-limiting example, the center point 144 of a first dilution hole (referred to herein as a first center point) can be a first axial distance (x1) from the radial plane (RP), the center point 144 of a second dilution hole (referred to herein as a second center point) can be a second axial distance (x2) from the center point 144 of the first dilution hole, and the center point 144 of a third dilution hole (referred to herein as a third center point) can be a third axial distance (x3) from the center point 144 of the second dilution hole, when the first dilution hole, the second dilution hole and the third dilution hole are axially adjacent one another. At least two of the first axial distance (x1), the second axial distance (x2) or the third axial distance (x3) can be equal or non-equal.

The first leg 126 extends at a first angle 136 with respect to the radial plane (RP). The second leg 128 extends at a second angle 138 with respect to the radial plane (RP). The first angle 136 and the second angle 138 are measured from where the first leg 126 and the second leg 128, respectively, intersect the radial plane (RP) or are axially nearest the radial plane (RP). The first angle 136 can be equal or non-equal in magnitude to the second angle 138. The first angle 136 and the second angle 138 have an absolute value of greater than or equal to 0 degrees and less than or equal to 80 degrees. As a non-limiting example, the first angle 136 and the second angle 138 have an absolute value of greater than 0 degrees and less than or equal to 80 degrees.

The first leg 126 and the second leg 128 each diverge from the apex 130 axially downstream of the apex 130 to define a dilution hole free segment 132 formed therebetween. The dilution hole free segment 132 is defined as a region of the outer liner 82*a* between the first leg 126 and the second leg 128 in which no dilution holes of the plurality of dilution holes 122 are present. The dilution hole free segment 132 extends along the outer liner 82*a* at a segment angle 134. The segment angle 134 includes an absolute value of greater than or equal to 20 degrees and less than or equal to 180 degrees.

The first dilution hole arrangement 150 can include any number of additional dilution holes that do not extend along the first leg 126 or the second leg 128. As a non-limiting example, a third subset of dilution holes 123 (illustrated in phantom lines) of the plurality of dilution holes 122 can be provided axially upstream of at least one of the first leg 126 or the second leg 128. It will be appreciated that the first subset of dilution holes 152 and the second subset of dilution holes 154 are defined as a portion of the plurality of dilution holes 122 that directly confront or otherwise define outer boundaries of the dilution hole free segment 132.

While the plurality of dilution holes 122 are illustrated as each having a circular cross-sectional area, it will be appreciated that the plurality of dilution holes 122 can take any suitable polygonal shape. Further, while the plurality of dilution holes 122 are illustrated as each having an equal cross-sectional area, it will be appreciated that the cross-sectional area of two or more dilution holes can be non-equal.

Figure 5:
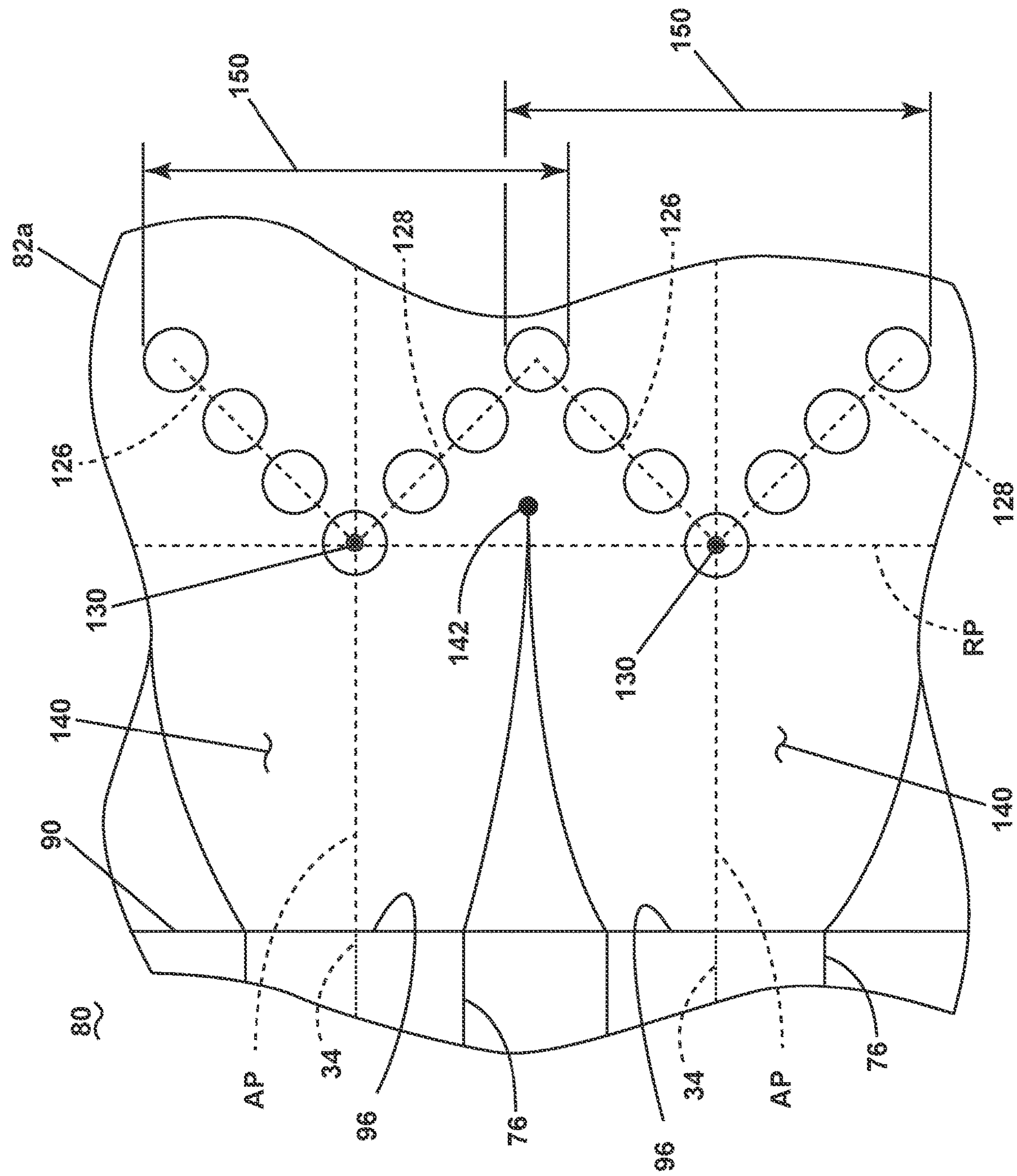
FIG. 5 is a schematic view of the liner of FIG. 4 as seen along a circumferential plane, with respect to the combustor centerline, and extending along the mean centerline, further illustrating two circumferentially spaced fuel cups each having a respective first dilution hole arrangement, according to the present disclosure.

FIG. 5 is a schematic view of the outer liner 82*a* of FIG. 4 as seen along a circumferential plane, with respect to the combustor centerline 36 (FIG. 2), and extending along the mean centerline 124 (FIG. 4). Two circumferentially spaced fuel cups 76 are illustrated with each having a corresponding first dilution hole arrangement 150. Each fuel cup 76 includes a respective first dilution hole arrangement 150 provided axially downstream of the respective fuel cup 76. The axial plane (AP) can coincide with or be offset from the fuel cup centerline 34 of the respective fuel cup 76.

The first dilution hole arrangements 150 can stem from one another such that they form an undulating or constant circumferential pattern along the outer liner 82*a*. As illustrated, the first dilution hole arrangements 150 form a zig-zag pattern. Each first dilution hole arrangement 150 can be the same or have a differing formation between the set of fuel cups 76. As a non-limiting example, there can be a plurality of dilution hole arrangements, with each dilution hole arrangement corresponding to a single fuel cup 76. At least two dilution hole arrangements of the plurality of dilution hole arrangements can differ in some way with respect to one another. As a non-limiting example, a total number of dilution holes 122 in the plurality of dilution holes for a single first dilution hole arrangement 150, a cross-sectional area of each dilution hole of the plurality of dilution holes 122, a formation of the first leg 126 or the second leg 128 (e.g., linear or non-linear), the second angle 138 or the break angle 134 can differ between the at least two dilution hole arrangements of the plurality of dilution holes arrangements. As a non-limiting example, the apex 130 of one first dilution hole arrangement 150 can be provided on a separate radial plane (RP) than the apex 130 of another first dilution hole arrangement 150.

During operation of the combustor 80, a flame 140 is emitted from each fuel cup 76 of the set of fuel cups 76. The emission of the flame 140 from each fuel cup 76 defines a plurality of circumferentially arranged flames within the combustion chamber 86. The flames 140 merge downstream of the respective fuel cup 76 at a merge point 142 such that the flame 140 is defined as a single, continuous annular flame downstream of the merge point 142. As used herein, the flame 140 can be a physical flame, the combustion gases (G) (FIG. 3), or a combination thereof.

The merge point 142 between two adjacent flames 140 can be provided between two circumferentially adjacent apexes 130. The merge point 142 can be provided forward of, axially aft of, or coincide with the radial plane (RP) intersecting one circumferentially adjacent apex 130.

The first dilution hole arrangement 150 is used to ensure that circumferentially adjacent flames 140 merge and that the merge point 142 is formed. Further, the first dilution hole arrangement 150 is used to ensure a uniform annular distribution of the flame 140 downstream of the merge point 142. This is done by exhausting the second dilution airflow (D2) (FIG. 3) into the combustion chamber 86 in order to direct and accelerate the flame 140 as desired. As a non-limiting example, when the flame 140 crosses a dilution hole of the plurality of dilution holes 122, the flame 140 can mix with the second dilution airflow (D2) exiting the respective dilution hole, which directs the flame 140 in the direction that the second airflow (D2) is moving and further accelerates the flame 140. In this way, the first dilution hole arrangements 150 shape and direct the flame 140 to ensure that adjacent flames 140 merge and that they form a uniform annulus of flame downstream of the merge point 142. As a non-limiting example, the first dilution hole arrangement 150 is used to ensure that the flame 140 at the end of the combustion section 14 (FIG. 1) and entering the turbine section 16 (FIG. 1) has a uniform temperature distribution by creating the uniform annulus of flame downstream of the merge point 142. The uniform temperature distribution ensures that points of the flame 140 exiting the combustion section 14 are not too hot or too cold, thus ensuring the gas turbine engine 10 (FIG. 1) operates as intended.

Directing the flame 140 through use of the first dilution hole arrangement 150 further directs the flame 140 away from the inner liner 82*b* and the outer liner 82*a*, thus ensuring that the inner liner 82*b* and the outer liner 82*a* are not overly heated by the flame 140. In other words, the directing of the flame 140 away from or radially towards the mean centerline 124 from the inner liner 82*b* and the outer liner 82*a* ensures that the heat from the flame 140 does not transmit or flow through the inner liner 82*b* or the outer liner 82*a* and damage portions of the gas turbine engine 10 (FIG. 1) that are outside of the inner liner 82*b* and the outer liner 82*a* with respect to the combustion chamber 86.

It has been found that use of the first dilution hole arrangement 150 is especially advantageous in instances where the fuel used in the combustion section 14 is a hydrogen-containing fuel. Hydrogen-containing fuel has a higher calorific value than convention fuels (e.g., fuels using carbons), thus the flame 140 generated with hydrogen-containing fuels burns hotter than a flame generated with conventional fuels. As such, directing the flame 140 away from various portions of the combustion section 14 (FIG. 1) (e.g., the inner liner 82*b* and the outer liner 82*a*) ensures that the heat from the flame 140 does not damage portions of the combustion section 14 that cannot withstand the heat of the flame 140. Further, the flame 140 generated by the hydrogen-containing fuel has a higher velocity than a flame generated by a conventional fuel. The higher velocity, in turn, means that the flame 140 tends to want to keep its shape, which can result in the flames 140 not merging and ultimate a non-uniform flame and temperature distribution at the outlet of the combustion section 14. The first dilution hole arrangement 150 is used to ensure that the flames 140 merge and have a uniform temperature and flame distribution.

Figure 6:
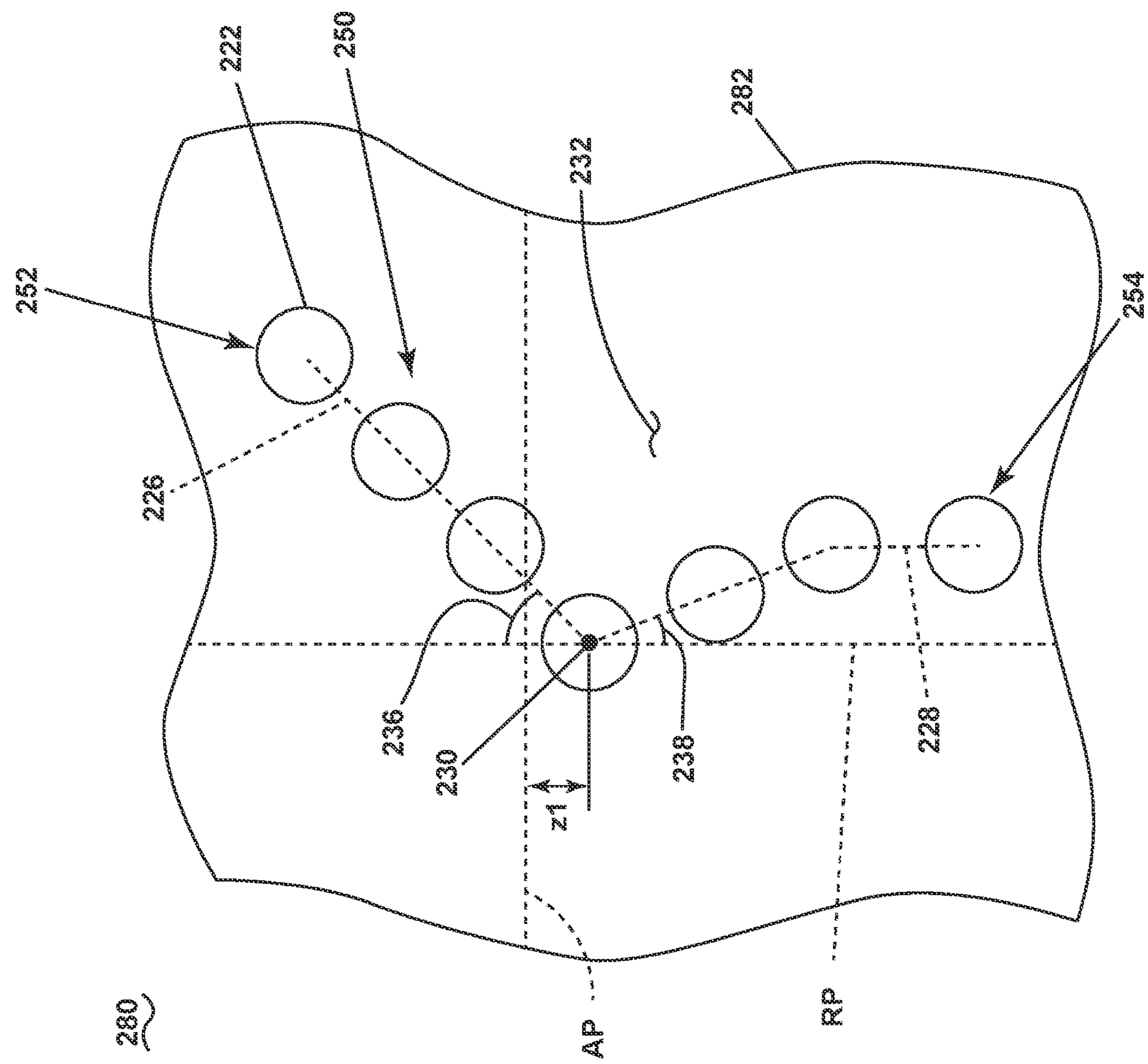
FIG. 6 is a schematic bottom view of a second dilution hole arrangement suitable for use within the combustor of FIG. 3, the second dilution hole arrangement having a plurality of dilution holes arranged along a first leg and a second, non-linear leg, according to the present disclosure.

FIG. 6 is a schematic bottom view of a second dilution hole arrangement 250 suitable for use within the combustor 80 of FIG. 3. The second dilution hole arrangement 250 is similar to the first dilution hole arrangement 150, therefore, like parts will be identified with like numerals increased to the 200 series with it being understood that the description of the first dilution hole arrangement 150 applies to the second dilution hole arrangement 250 unless noted otherwise.

The second dilution hole arrangement 250 is provided along a liner 282 of a combustor 280. The second dilution hole arrangement 250 includes a plurality of dilution holes 222. A first subset of dilution holes 252 of the plurality of dilution holes 222 extend along a first leg 226. A second subset of dilution holes 254 of the plurality of dilution holes 222 extend along a second leg 228. The first leg 226 and the second leg 228 meet at an apex 230. An axial plane (AP) and a radial plane (RP) are used as planes of reference. The first leg 226 forms a first angle 236 with respect to the radial plane (RP). The second leg 228 forms a second angle 238 with respect to the radial plane (RP). A dilution hole free segment 232 is formed between the first leg 226 and the second leg 228.

The second dilution hole arrangement 250 is similar to the first dilution hole arrangement 150, however, at least one of the first leg 226 or the second leg 228 is non-linear. As illustrated, the second leg 228 is non-linear. It will be appreciated that the first leg 226 and the second leg 228 can take any suitable shape or form of a leg that diverges axially downstream of the apex 230. Further, a magnitude of the second angle 238 is non-equal to a magnitude of the first angle 236.

The apex 230 can be offset from the axial plane (AP) a circumferential distance (z1). The circumferential distance (z1) can be negative (as illustrated) or positive. The circumferential distance (z1) can be any suitable distance. With the circumferential distance (z1), the apex 230 is offset from the axial plane (AP).

Figure 7:
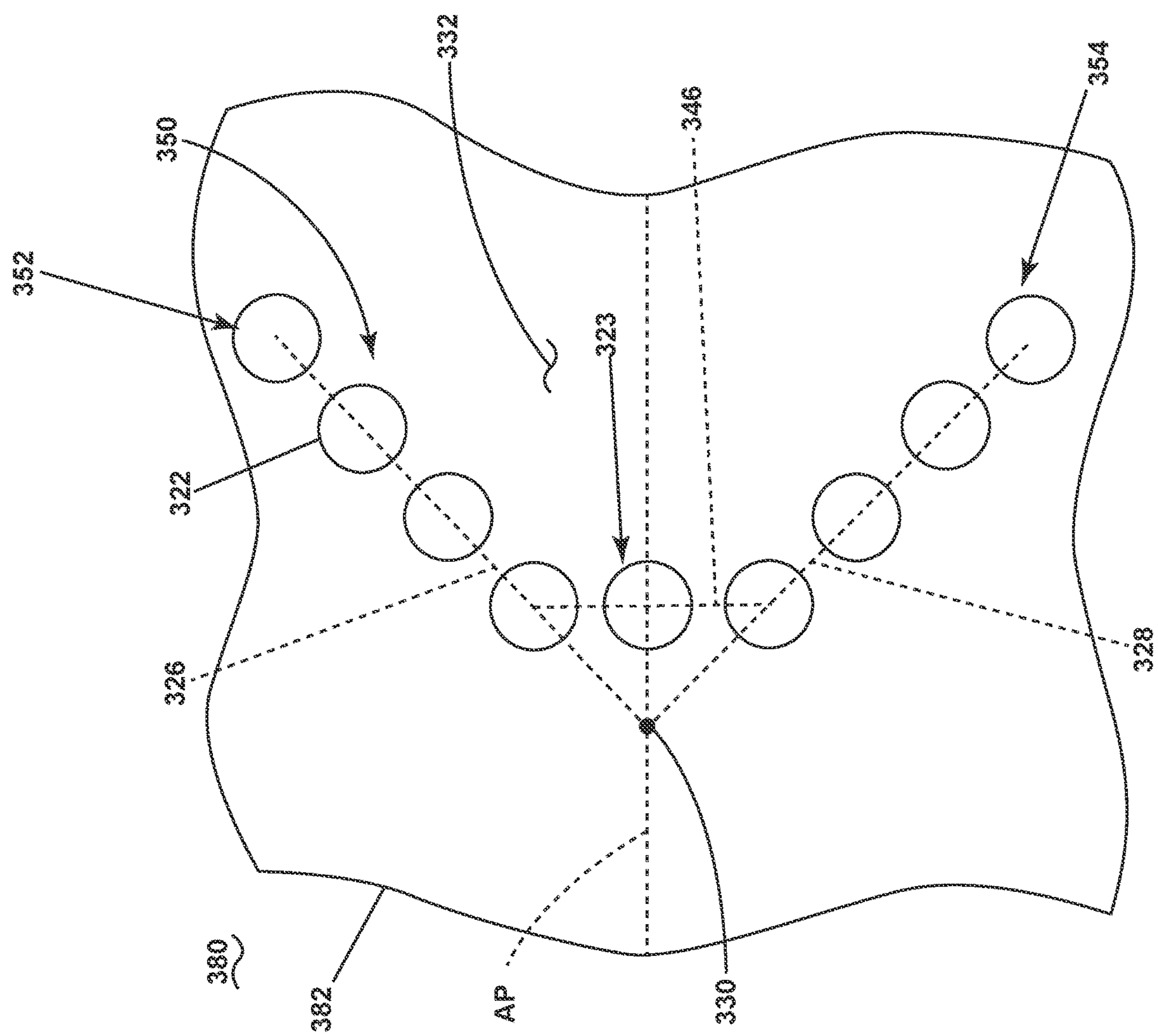
FIG. 7 is a schematic bottom view of a third dilution hole arrangement suitable for use within the combustor of FIG. 3, the third dilution hole arrangement having a plurality of dilution holes arranged along a first leg, a second leg, and a third leg, according to the present disclosure.

FIG. 7 is a schematic bottom view of a third dilution hole arrangement 350 suitable for use within the combustor 80 of FIG. 3. The third dilution hole arrangement 350 is similar to the dilution hole arrangement 150, 250, therefore, like parts will be identified with like numerals increased to the 300 series with it being understood that the description of the dilution hole arrangement 150, 250 applies to the third dilution hole arrangement 350 unless noted otherwise.

The third dilution hole arrangement 350 is provided along a liner 382 of a combustor 380. The third dilution hole arrangement 350 includes a plurality of dilution holes 322. A first subset of dilution holes 352 of the plurality of dilution holes 322 extend along a first leg 326. A second subset of dilution holes 354 of the plurality of dilution holes 322 extend along a second leg 328. The first leg 326 and the second leg 328 meet at an apex 330. An axial plane (AP) is used as plane of reference. A dilution hole free segment 332 is formed between the first leg 326 and the second leg 328.

The third dilution hole arrangement 350 is similar to the dilution hole arrangement 150, 250, except that the third dilution hole arrangement 350 further includes a third subset of dilution holes 323 that extend along a third leg 346. The third leg 346, as illustrated, interconnects the first leg 326 and the second leg 328. The third leg 346 can extend perpendicular to or non-periductular to the axial plane (AP). The dilution hole free segment 332 is provided axially downstream of the third leg 346. The difference between the third subset of dilution holes 323 and the third subset of dilution holes 123 (FIG. 4) is that the third subset of dilution holes 323 extend along the third leg 346 and further define a portion of the dilution hole free segment 332. It will be further appropriated that a dilution hole can be provided in more than one subset of dilution holes. For example, a dilution hole provided on a vertex between the first leg 326 and the third leg 346 can be included within both of the first subset of dilution holes 352 and the third subset of dilution holes 323.

The apex 330 of the first leg 326 and the second leg 328 is provided axially upstream of the plurality of dilution holes 322 extend along the first leg 326, the second leg 328 and the third leg 346. The apex 330 can lie on or be offset from a radial plane (e.g., the radial plane (RP) of FIG. 4). As a non-limiting example, the third leg 346 can coincide with the radial plane.

It is contemplated that the third dilution hole arrangement 350 can be varied based on the anticipated flame (e.g., the flame 140 of FIG. 5) exiting the fuel cup (e.g., the fuel cup 76 of FIG. 3) upstream of the third dilution hole arrangement 350. As a non-limiting example, hot combustion gases generated by the flame can flow into the combustor 380 along a projection of the fuel cup centerline (e.g., the fuel cup centerline 34 of FIG. 5) and into the combustion chamber (e.g., the combustion chamber 86 of FIG. 3). The third dilution hole arrangement 350 can be arranged such that a larger amount of compressed air (e.g., the compressed air D2 of FIG. 3) is present near where the combustion gases are expected (e.g., along the axial plane (AP)). This can be done by introducing a larger concentration of dilution holes 322 near the axial plane (AP) or by increasing the cross-sectional area of the dilution holes 322 near the axial plane (AP).

Figure 8:
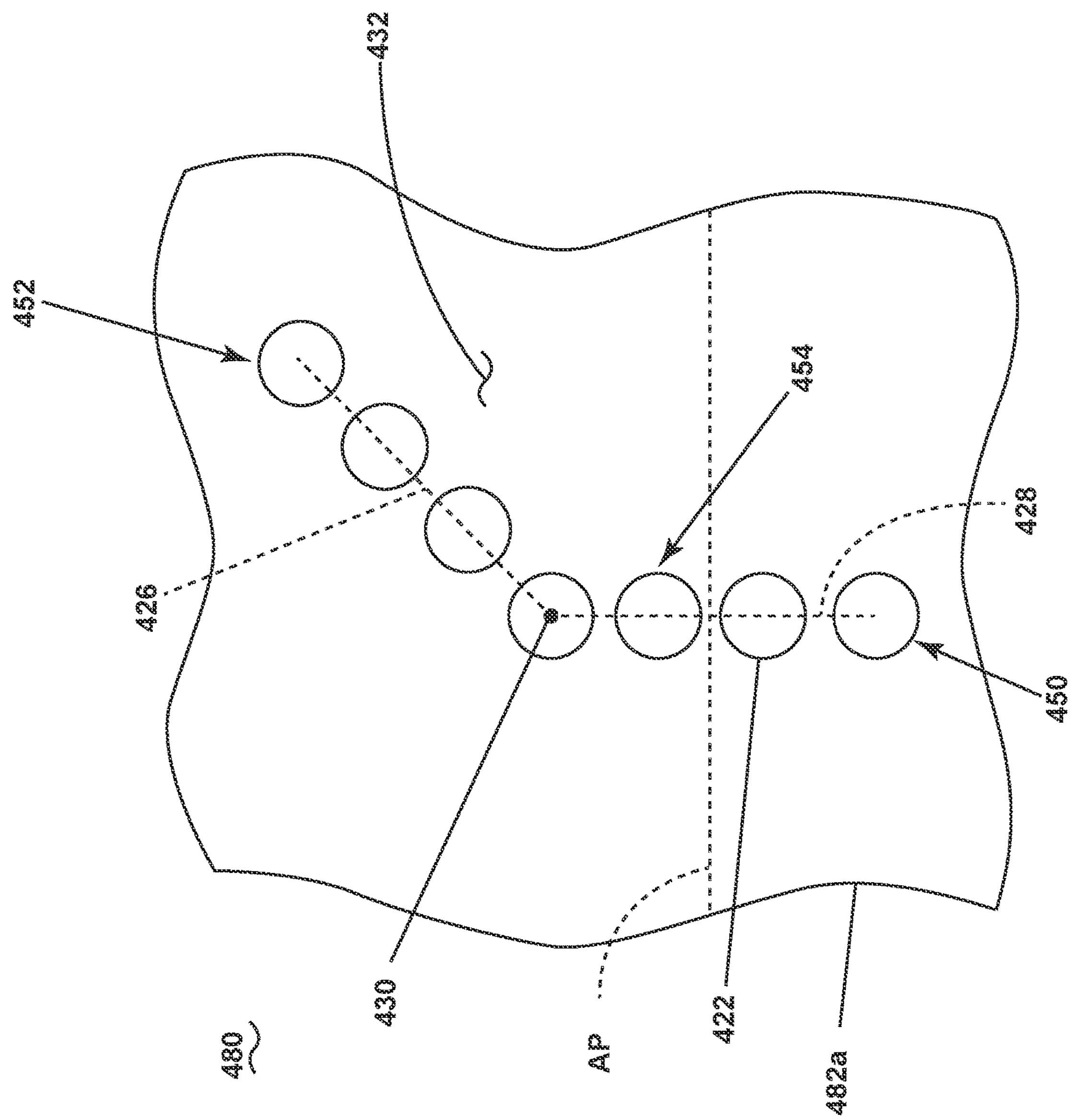
FIG. 8 is a schematic bottom view of a fourth dilution hole arrangement suitable for use within the combustor of FIG. 3, the fourth dilution hole arrangement provided on an outer liner, according to the present disclosure.

FIG. 8 is a schematic bottom view of a fourth dilution hole arrangement 450 suitable for use within the combustor 80 of FIG. 3. The fourth dilution hole arrangement 450 is similar to the dilution hole arrangement 150, 250, 350, therefore, like parts will be identified with like numerals increased to the 400 series with it being understood that the description of the dilution hole arrangement 150, 250, 350 applies to the fourth dilution hole arrangement 450 unless noted otherwise.

The fourth dilution hole arrangement 450 is provided along an outer liner 482*a* of a combustor 480. The fourth dilution hole arrangement 450 includes a plurality of dilution holes 422. A first subset of dilution holes 452 of the plurality of dilution holes 422 extend along a first leg 426. A second subset of dilution holes 454 of the plurality of dilution holes 422 extend along a second leg 428. The first leg 426 and the second leg 428 meet at an apex 430. An axial plane (AP) is used as plane of reference. A dilution hole free segment 432 is formed between the first leg 426 and the second leg 428.

The apex 430, like the apex 230 (FIG. 6) can be offset from the axial plane (AP). One of the first leg 426 or the second leg 428 can extend perpendicular to the axial plane (AP) such that the first angle or the second angle (e.g., the first angle 136 or the second angle 138 of FIG. 4) is 0 degrees.

Figure 9:
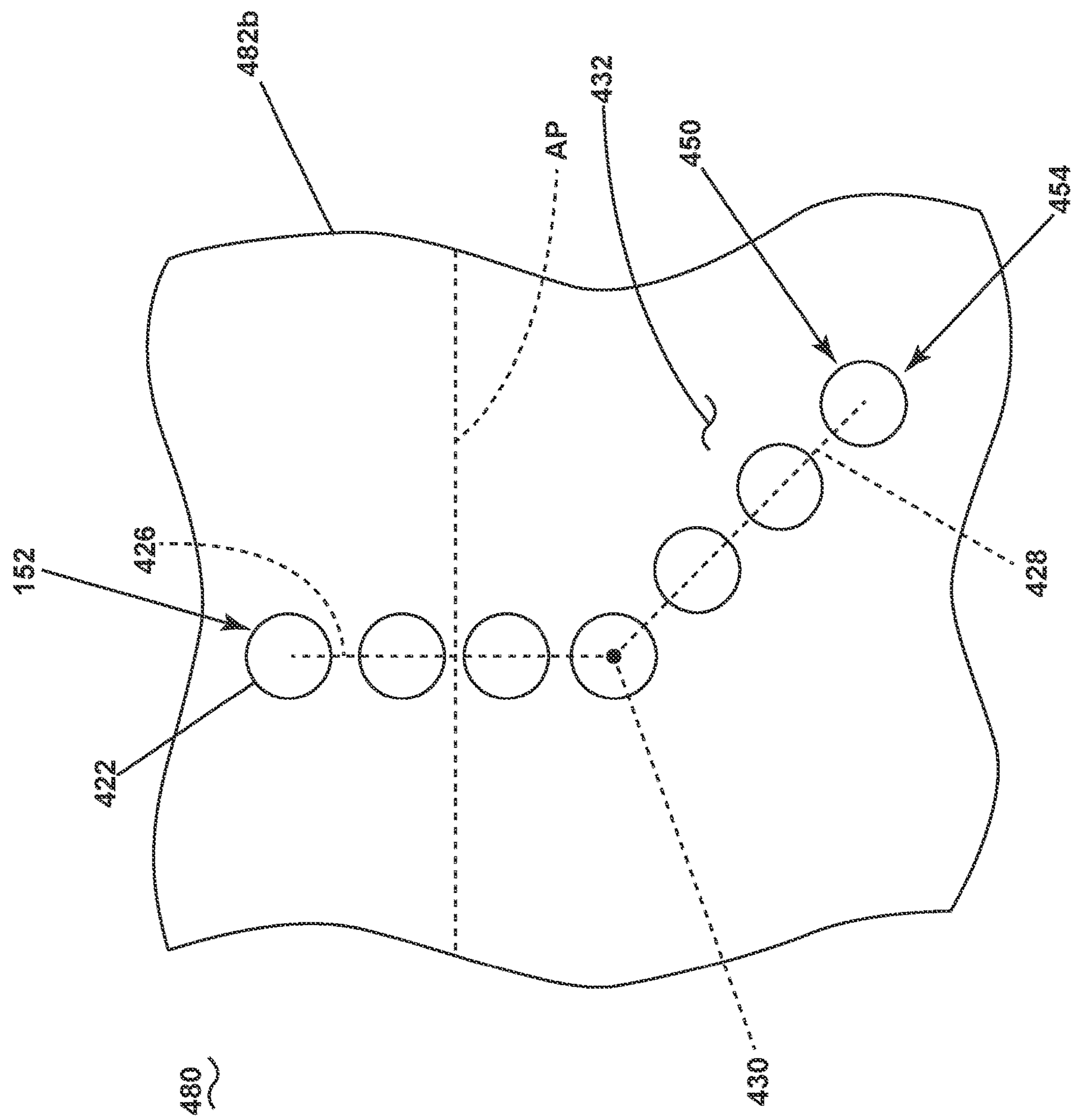
FIG. 9 is a schematic top view of the fourth dilution hole arrangement suitable for use within the combustor including the fourth dilution hole arrangement of FIG. 8, the dilution hole arrangement provided on an inner liner, according to the present disclosure.

FIG. 9 is a schematic top view of the fourth dilution hole arrangement 450 suitable for use within the combustor 480 including the fourth dilution hole arrangement 450 of FIG. 8. The fourth dilution hole arrangement 450 is provided on an inner liner 482*b*.

With reference to both FIG. 8 and FIG. 9, the fourth dilution hole arrangement 450 on the outer liner 482*a* can be formed symmetrically or asymmetrically about the mean centerline (e.g., the mean centerline 124 of FIG. 3) with respect to the fourth dilution hole arrangement 450 on the inner liner 482*b*. As illustrated, the fourth dilution hole arrangement 450 on the outer liner 482*a* and the fourth dilution hole arrangement 450 on the inner liner 482*b* are asymmetric.

The relation between the fourth dilution hole arrangement 450 of the inner liner 482*b* and the outer liner 482*a* (e.g., symmetric or asymmetric about the mean centerline) can be chosen based on the known or anticipated flame profile of the flame (e.g., the flame 140 of FIG. 5) exiting the respective fuel cup (e.g., the fuel cup 76 of FIG. 5) upstream of the fourth dilution hole arrangement 450 on the inner liner 482*b* and the outer liner 482*a*. As a non-limiting example, the flame that exits the respective fuel cup can have an asymmetric temperature or flame distribution about the mean centerline. In such an instance, the fourth dilution hole arrangement 450 can be varied between the inner liner 482*b* and the outer liner 482*a* to ensure that the flame that is downstream the fourth dilution hole arrangement 450 and at the exit of the combustor 480 has a uniform temperature distribution and uniform flame distribution.

Figure 10:
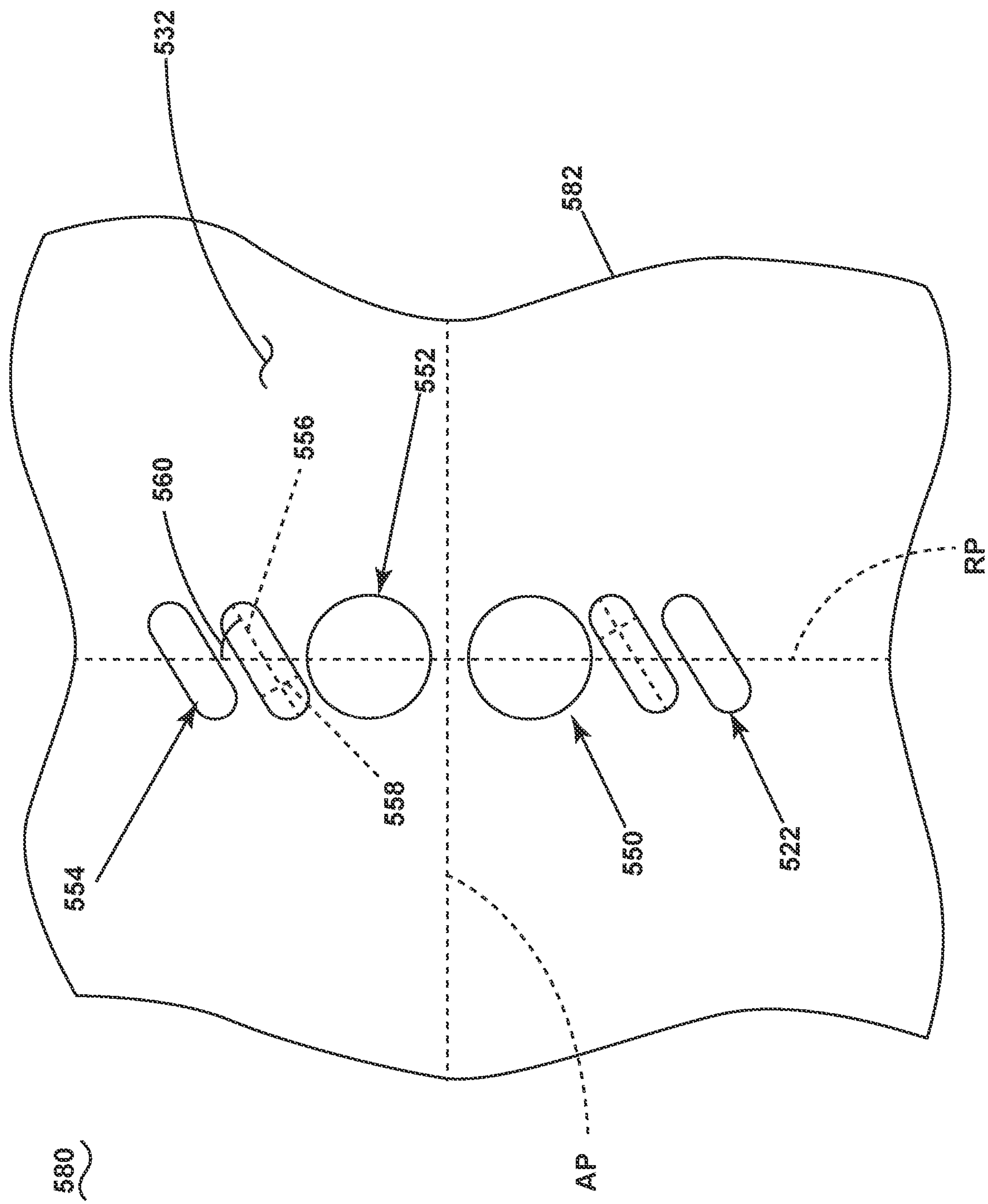
FIG. 10 is a schematic bottom view of a fifth dilution hole arrangement suitable for use within the combustor of FIG. 3, the dilution hole arrangement having a dilution hole with a major body axis and a minor body axis, according to the present disclosure.

FIG. 10 is a schematic bottom view of a fifth dilution hole arrangement 550 suitable for use within the combustor 80 of FIG. 3. The fifth dilution hole arrangement 550 is similar to the dilution hole arrangement 150, 250, 350, 450, therefore, like parts will be identified with like numerals increased to the 500 series with it being understood that the description of the dilution hole arrangement 150, 250, 350, 450 applies to the fifth dilution hole arrangement 550 unless noted otherwise.

The fifth dilution hole arrangement 550 is provided along a liner 582 of a combustor 580. The fifth dilution hole arrangement 550 includes a plurality of dilution holes 522. An axial plane (AP) and a radial plane (RP) are used as planes of reference. A dilution hole free segment 532 is formed axially downstream of the plurality of dilution holes 522.

The fifth dilution hole arrangement 550, like the dilution hole arrangement 150, 250, 350, 450, includes a first subset of dilution holes 552 and a second subset of dilution holes 554 of the plurality of dilution holes 522. The first subset of dilution holes 552 and the second subset of dilution holes 554 extend long the radial plane (RP). The second subset of dilution holes 554 are further defined as a subset of dilution holes that each have a major body axis 556 and a minor body axis 558. The first subset of dilution holes 552 have a differing formation with respect to the second subset of dilution holes 554. As a non-limiting example, the first subset of dilution holes 552 have a differing cross-sectional area with respect to the second subset of dilution holes 554; the first subset of dilution holes 552 are circular, while the second subset of dilution holes 554 are oblong.

The major body axis 556 of the second subset of dilution holes 554 can be angled with respect to the radial plane (RP) to form a dilution hole angle 560 therebetween. The dilution hole angle 560 has an absolute value of greater than or equal to 0 degrees and less than or equal to 90 degrees.

The first subset of dilution holes 552 each include a first cross-sectional area. The second subset of dilution holes 554 each include a second cross-sectional area. The second cross-sectional area can be from 5% to 80% larger than the first cross-sectional area.

The second subset of dilution holes 554 on a first circumferential side of the axial plane (AP) can extend in a same direction as the second subset of dilution holes 554 on a second circumferential side, opposite the first circumferential side, of the axial plane (AP). The fifth dilution hole arrangement 550 can be symmetric or asymmetric about the axial plane (AP).

Figure 11:
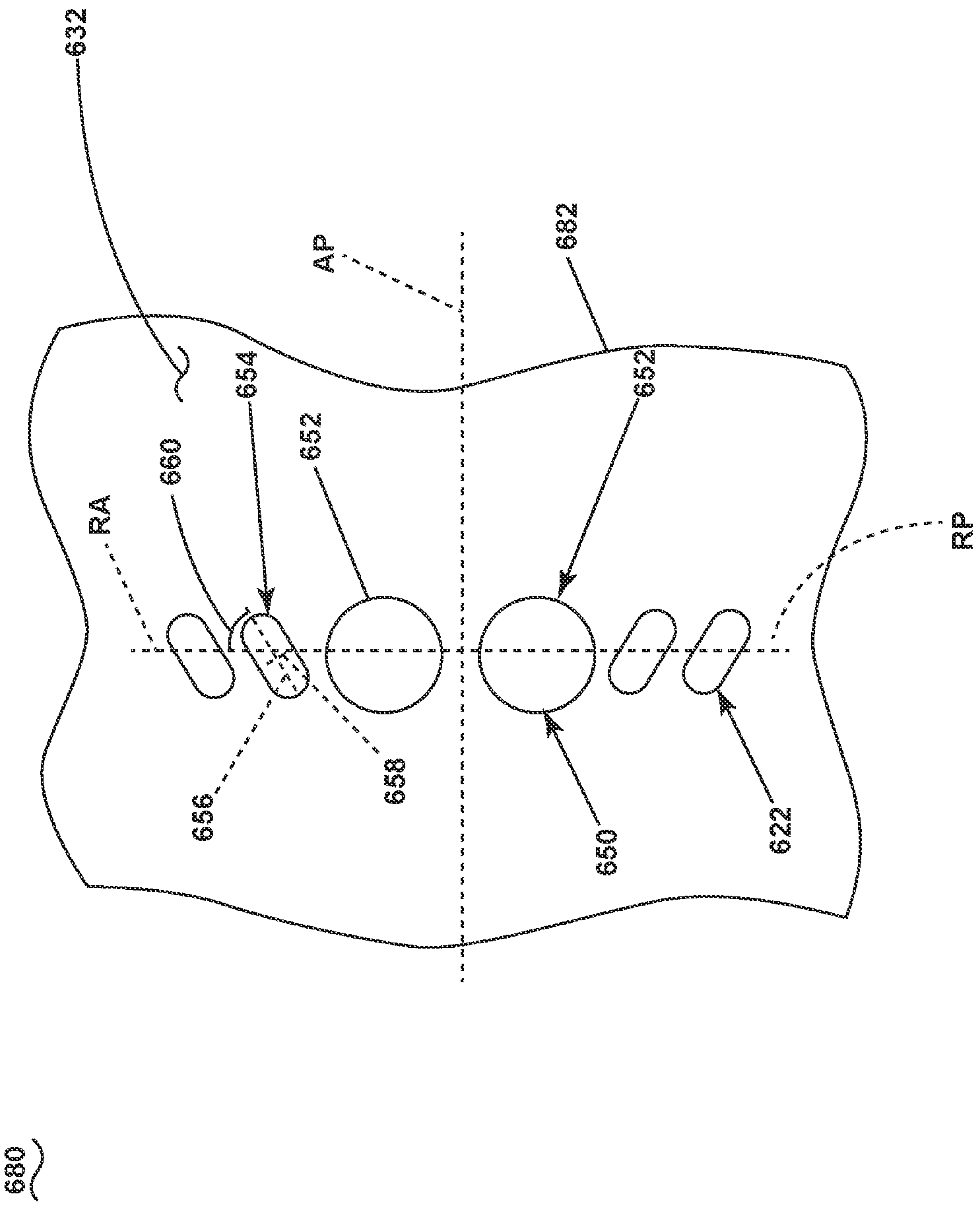
FIG. 11 is a schematic bottom view of a sixth dilution hole arrangement suitable for use within the combustor of FIG. 3, the dilution hole arrangement having a dilution hole with a major body axis and a minor body axis, according to the present disclosure.

FIG. 11 is a schematic bottom view of a sixth dilution hole arrangement 650 suitable for use within the combustor 80 of FIG. 3. The sixth dilution hole arrangement 650 is similar to the dilution hole arrangement 150, 250, 350, 450, 550, therefore, like parts will be identified with like numerals increased to the 600 series with it being understood that the description of the dilution hole arrangement 150, 250, 350, 450, 550 applies to the sixth dilution hole arrangement 650 unless noted otherwise.

The sixth dilution hole arrangement 650 is provided along a liner 682 of a combustor 680. The sixth dilution hole arrangement 650 includes a plurality of dilution holes 622 including a first subset of dilution holes 652 and a second subset of dilution holes 654. The second subset of dilution holes 654 each include a major body axis 656 and a minor body axis 658. An axial plane (AP) and a radial plane (RP) are used as planes of reference. The major body axis 656 forms a dilution hole angle 660 with respect to the radial plane (RP). A dilution hole free segment 632 is formed axially downstream of the plurality of dilution holes 622.

The sixth dilution hole arrangement 650 is similar to the fifth dilution hole arrangement 550 in that the sixth dilution hole arrangement 650 includes the second subset of dilution holes 654. The difference, however, is that the second subset of dilution holes 654 on a first circumferential side of the axial plane (AP) can extend in an opposing direction as the second subset of dilution holes 654 on a second circumferential side, opposite the first circumferential side, of the axial plane (AP). The sixth dilution hole arrangement 650 can be symmetric or asymmetric about the axial plane (AP).

It is contemplated that different cross sections of the dilution holes 622 can have varying flame shaping properties. As a non-limiting example, a circular cross-sectional area results in a dilution hole 622 that exhausts dilution airflow that penetrates deeper into the flame or combustion chamber than the dilution airflow from an oblong dilution hole.

Benefits of the present disclosure include a combustor suitable for use with a hydrogen-containing fuel. As outlined previously, hydrogen-containing fuels have a higher flame temperature and velocity than traditional fuels (e.g., fuels not containing hydrogen). That is, hydrogen or a hydrogen mixed fuel typically has a wider flammable range and a faster burning velocity than traditional fuels such petroleum-based fuels, or petroleum and synthetic fuel blends. These high burn temperatures of hydrogen-containing fuel mean that additional insulation is needed between the ignited hydrogen-containing fuel and surrounding components of the gas turbine engine (e.g., the inner/outer liner, and other parts of the gas turbine engine). The combustor, as described herein, includes the dilution passage arrangement that directs the flame away from the liner, thus ensuring the liner is not overly heated. Further, the dilution hole arrangement is used to ensure that adjacent flames merge and that a uniform annulus of flame and flame temperature is formed at the outlet of the combustion section. By shaping the flame, the liner wall temperature, the combustor exit temperature profile and pattern of the flame/gas exiting the combustor can be controlled. This control or flame shaping can further ensure that the combustion section or otherwise hot sections of the turbine engine do not fail or otherwise become ineffective by being overly heated, thus increasing the lifespan of the turbine engine.

Benefits associated with using hydrogen-containing fuel over conventional fuels include an eco-friendlier engine as the hydrogen-containing fuel, when combusted, generates less carbon pollutants than a combustor using conventional fuels. For example, a combustor including 100% hydrogen-containing fuel (e.g., the fuel is 100% $H_2$) would have zero carbon pollutants. The combustor, as described herein, can be used in instances where 100% hydrogen-containing fuel is used.

Further benefits associated with using hydrogen-containing fuel over conventional fuels include a gas turbine engine that can utilize less fuel due to higher heating value of fuel to achieve same turbine inlet temperatures. For example, a conventional gas turbine engine using conventional fuels will require more fuel to produce the same amount of work or engine output as the present gas turbine engine using hydrogen-containing fuels. This, in turn, means that either a lesser amount of fuel can be used to generate the same amount of engine output as a conventional gas turbine engine, or the same amount of fuel can be used to generate an excess of increased engine output when compared to the conventional gas turbine engine.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A combustor for a gas turbine engine, the combustor defining a combustor centerline and comprising a dome wall, a set of fuel cups located on the dome wall, with each fuel cup of the set of fuel cups having a fuel cup centerline and an outlet, an inner liner and an outer liner, which, in combination with the dome wall, at least partially define a combustion chamber having a mean centerline for each fuel cup of the set of fuel cups, with the mean centerline being equidistant between the inner liner and the outer liner, and lying in an axial plane from the combustor centerline, the axial plane intersecting the fuel cup centerline at the outlet, and a set of dilution passages terminating in a plurality of dilution holes arranged in a dilution hole arrangement provided in at least one of the inner liner or the outer liner, with the dilution hole arrangement having at least a first subset of dilution holes arranged along a first leg and a second subset of dilution holes arranged along a second leg, with the first leg and the second leg meeting at an apex that is pointed toward the dome wall.

A combustor for a gas turbine engine, the combustor defining a combustor centerline and comprising a dome wall, a set of fuel cups located on the dome wall, with each fuel cup of the set of fuel cups having an outlet defining a fuel cup centerline, an inner liner and an outer liner, which, in combination with the dome wall, at least partially define a combustion chamber having a mean centerline for each fuel cup of the set of fuel cups, with the mean centerline being equidistant between the inner liner and the outer liner, and lying in an axial plane from the combustor centerline, the axial plane intersecting the fuel cup centerline at the outlet, and a set of dilution passages terminating in a plurality of dilution holes provided in at least one of the inner liner or the outer liner, the plurality of dilution holes including a first subset of dilution holes, and a second subset of dilution holes, different from the first subset of dilution holes, with each dilution hole of the second subset of dilution holes including a major body axis and a minor body axis, with the major body axis forming a dilution hole angle with respect to a radial plane extending from the combustor centerline that passes through a respective major body axis and is perpendicular to the axial plane, with the dilution hole angle having an absolute value of greater than or equal to 0 degrees and less than or equal to 90 degrees.

The combustor of any preceding clause, wherein the plurality of dilution holes are provided within a plurality of dilution hole arrangements circumferentially spaced about the combustor centerline, and each of the plurality of dilution hole arrangements corresponding to a different one of the fuel cups in the set of fuel cups.

The combustor of any preceding clause, wherein at least two dilution hole arrangements of the plurality of dilution hole arrangements differ with respect to one another.

The combustor of any preceding clause, wherein the apex is provided in the axial plane.

The combustor of any preceding clause, wherein the apex is offset from the axial plane.

The combustor of any preceding clause, wherein the first leg and the second leg form a first angle and a second angle, respectively, with respect to a radial plane extending from the combustor centerline that passes through the apex and is perpendicular to the axial plane.

The combustor of any preceding clause, wherein the first angle and the second angle have an absolute value of greater than or equal to 0 degrees and less than or equal to 80 degrees.

The combustor of any preceding clause, wherein one of the first angle or the second angle is non-zero and the other of the first angle and the second angle is zero.

The combustor of any preceding clause, wherein the apex is located within boundaries of a dilution hole of the plurality of dilution holes.

The combustor of any preceding clause, further comprising a third subset of dilution holes axially spaced upstream of the first leg.

The combustor of any preceding clause, wherein the first leg and the second leg diverge axially downstream of the apex to define a dilution hole free segment of the dilution hole arrangement.

The combustor of any preceding clause, wherein the dilution hole free segment extends across a segment angle that is greater than or equal to 20 degrees and less than or equal to 180 degrees.

The combustor of any preceding clause, wherein a third leg interconnects the first leg and the second leg downstream of the apex, with a third subset of dilution holes extending along the third leg.

The combustor of any preceding clause, wherein the inner liner and the outer liner each include a respective set of dilution passages terminating in a respective plurality of dilution holes and forming respective dilution hole arrangements on the inner liner and the outer liner.

The combustor of any preceding clause, wherein the dilution hole arrangements on the inner liner and the outer liner are asymmetric about the mean centerline.

The combustor of any preceding clause, wherein a radial plane extending from the combustor centerline passes through the apex and is perpendicular to the axial plane, each dilution passage of the set of dilution passages includes a passage centerline, and the plurality of dilution holes extending along the first leg include a first dilution hole having a first center point where the passage centerline meets the first dilution hole, the first center point spaced a first axial distance from the radial plane, and a second dilution hole having a second center point where the passage centerline meets the second dilution hole, the second center point spaced a second axial distance, different from or equal to the first axial distance, from the first center point.

The combustor of any preceding clause, wherein the set of fuel cups receives a hydrogen-containing fuel.

The combustor of any preceding clause, wherein at least a portion of the plurality of dilution holes are symmetric or asymmetric about the axial plane.

The combustor of any preceding clause, wherein the plurality of dilution holes includes at least a first dilution hole with a first cross-sectional area and a second dilution hole with a second cross-sectional area, with the second cross-sectional being from 5% to 80% larger than the first cross-sectional area.

The combustor of any preceding clause, wherein each dilution hole of the plurality of dilution holes includes a cross-sectional area.

The combustor of any preceding clause, wherein the cross-sectional area is the same between dilution holes in the dilution hole arrangement.

The combustor of any preceding clause, wherein at least two dilution holes in the dilution hole arrangement include a non-equal cross-sectional area.

The combustor of any preceding clause, wherein the cross-sectional area of the plurality of dilution holes in the dilution hole arrangement is circular.

The combustor of any preceding clause, wherein during operation of the combustor, wherein a flame is emitted from each fuel cup of the set of fuel cups and into the combustion chamber to define a plurality of circumferentially spaced flames within the combustion chamber.

The combustor of any preceding clause, wherein the plurality of dilution holes emit a compressed airflow into the combustion chamber that mixes with at least one of either the plurality of circumferentially spaced flames or a combustion gas generated from the plurality of circumferentially spaced flames.

The combustor of any preceding clause, wherein circumferentially adjacent flames of the plurality of circumferentially spaced flames merge at a respective merge point.

The combustor of any preceding clause, wherein the merge point is provided axially forward of the apex.

The combustor of any preceding clause, wherein the merge point axially coincides with the apex.

The combustor of any preceding clause, wherein the merge point is provided axially aft of the apex.

What is claimed is:

1. A combustor for a gas turbine engine, the combustor defining a combustor centerline and comprising:

- a dome wall;
- a set of fuel cups located on the dome wall, with each fuel cup of the set of fuel cups having a fuel cup centerline and an outlet;
- an inner liner and an outer liner, which, in combination with the dome wall, at least partially define a combustion chamber having a mean centerline for each fuel cup of the set of fuel cups, with the mean centerline being equidistant between the inner liner and the outer liner; and
- a set of dilution passages terminating in a plurality of dilution holes arranged in a dilution hole arrangement provided in at least one of the inner liner or the outer liner, with the dilution hole arrangement having at least a first subset of dilution holes arranged along a first leg and a second subset of dilution holes arranged along a second leg, with the first leg and the second leg meeting at an apex that is pointed toward the dome wall, the apex coinciding with a center point of a dilution hole of the plurality of dilution holes, and with the first leg terminating at a center point of an axially downstream most dilution hole of the first subset of dilution holes, and the second leg terminating at a center point of an axially downstream most dilution hole of the second subset of dilution holes;

wherein:

- the first leg forms a first angle with respect to a radial plane that is perpendicular to the combustor centerline and passes through the apex, the first angle having an absolute value being greater than or equal to 0 degrees and less than 90 degrees;
- the second leg forms a second angle with respect to the radial plane, the second angle having an absolute value being greater than or equal to 0 degrees and less than 90 degrees; and
- the first leg and the second leg diverge axially downstream of the apex defining a segment angle therebetween, with an entire circumferential area formed between the apex, the axially downstream most dilution hole of the first subset of dilution holes and the axially downstream most dilution hole of the second subset of dilution holes being devoid of any dilution holes, the area being defined by the segment angle, and the area being located along the at least one of the inner liner or the outer liner.

2. The combustor of claim 1, wherein the plurality of dilution holes are provided within a plurality of dilution hole arrangements circumferentially spaced about the combustor centerline, and each of the plurality of dilution hole arrangements corresponding to a different one of the fuel cups in the set of fuel cups.

3. The combustor of claim 2, wherein at least two dilution hole arrangements of the plurality of dilution hole arrangements differ with respect to one another.

4. The combustor of claim 1, wherein the apex is provided along an axial plane extending along the mean centerline and intersecting the fuel cup centerline at the outlet of an axially upstream and circumferentially nearest fuel cup of the set of fuel cups to the apex.

5. The combustor of claim 1, wherein the apex is offset from an axial plane extending along the mean centerline and intersecting the fuel cup centerline at the outlet of an axially upstream and circumferentially nearest fuel cup of the set of fuel cups to the apex.

6. The combustor of claim 1, wherein the first angle and the second angle have an absolute value of greater than or equal to 0 degrees and less than or equal to 80 degrees.

7. The combustor of claim 6, wherein one of the first angle or the second angle is non-zero and the other of the first angle and the second angle is zero.

8. The combustor of claim 1, wherein the apex is located within boundaries of a dilution hole of the plurality of dilution holes.

9. The combustor of claim 1, further comprising a third subset of dilution holes axially spaced upstream of the first leg.

10. The combustor of claim 1, wherein the segment angle is greater than or equal to 20 degrees and less than or equal to 180 degrees.

11. The combustor of claim 1, wherein the plurality of dilution holes form dilution hole arrangements located on both of the inner liner and the outer liner.

12. The combustor of claim 11, wherein the dilution hole arrangements on the inner liner and the outer liner are asymmetric about the mean centerline.

13. The combustor of claim 1, wherein a radial plane extending from the combustor centerline passes through the apex and is perpendicular to the combustor centerline, each dilution passage of the set of dilution passages includes a passage centerline, and the plurality of dilution holes extending along the first leg include:

- a first dilution hole having a first center point where the passage centerline meets the first dilution hole, the first center point spaced a first axial distance from the radial plane; and
- a second dilution hole having a second center point where the passage centerline meets the second dilution hole, the second center point spaced a second axial distance, different from or equal to the first axial distance, from the first center point.

14. The combustor of claim 1, wherein the set of fuel cups receives a hydrogen-containing fuel.

15. A combustor for a gas turbine engine, the combustor defining a combustor centerline and comprising:

- a dome wall;
- a set of fuel cups located on the dome wall, with each fuel cup of the set of fuel cups having a fuel cup centerline and an outlet;
- an inner liner and an outer liner, which, in combination with the dome wall, at least partially define a combustion chamber having a mean centerline for each fuel cup of the set of fuel cups, with the mean centerline being equidistant between the inner liner and the outer liner; and
- a set of dilution passages terminating in a plurality of dilution holes arranged in a dilution hole arrangement provided in at least one of the inner liner or the outer liner;

wherein the dilution hole arrangement has at least a first subset of at least three dilution holes arranged along a continuous straight first leg and a second subset of at least three dilution holes arranged along a continuous straight second leg, with the first leg and the second leg meeting at an apex that is pointed toward the dome wall; and wherein a dilution hole of the first subset of at least three dilution holes and the second subset of at least three dilution holes located nearest the apex is defined as:

an axially farthest upstream dilution hole of the first subset of at least three dilution holes and the second subset of at least three dilution holes; and a circumferential nearest dilution hole of the first subset of at least three dilution holes and the second subset of at least three dilution holes to an axial plane extending along the mean centerline and intersecting the fuel cup centerline of a circumferentially nearest fuel cup of the set of fuel cups.

16. The combustor of claim 1, wherein each dilution hole of the plurality of dilution holes has a cross-sectional area that is circular or oblong.

17. A combustor for a gas turbine engine, the combustor defining a combustor centerline and comprising:

a dome wall;

an inner liner and an outer liner, which, in combination with the dome wall, at least partially define a combustion chamber; and a plurality of dilution holes arranged in a dilution hole arrangement provided in at least one of the inner liner or the outer liner, with the dilution hole arrangement having at least a first subset of dilution holes arranged along a first leg and a second subset of dilution holes arranged along a second leg, with the first leg and the second leg meeting at an apex, the apex coinciding with a center point of a dilution hole of the plurality of dilution holes, and with the first leg terminating at a center point of an axially downstream most dilution hole of the first subset of dilution holes, and the second leg terminating at a center point of an axially downstream most dilution hole of the second subset of dilution holes;

wherein:

the first leg forms a first angle with respect to a radial plane that is perpendicular to the combustor centerline and passes through the apex, the first angle having an absolute value being greater than or equal to 0 degrees and less than 90 degrees;

the second leg forms a second angle with respect to the radial plane, the second angle having an absolute value being greater than or equal to 0 degrees and less than 90 degrees; and the first leg and the second leg diverge axially downstream of the apex, with an entire circumferential area formed between the apex, the axially downstream most dilution hole of the first subset of dilution holes and the axially downstream most dilution hole of the second subset of dilution holes being devoid of any holes, the area being located along the at least one of the inner liner or the outer liner.

* * * * *